United States Patent
Ye et al.

(10) Patent No.: US 10,235,663 B2
(45) Date of Patent: Mar. 19, 2019

(54) METHOD, SYSTEM AND SERVER SYSTEM OF PAYMENT BASED ON A CONVERSATION GROUP

(71) Applicant: Tencent Technology (Shenzhen) Company Limited, Shenzhen (CN)

(72) Inventors: Wa Ye, Shenzhen (CN); Zhenyu Xu, Shenzhen (CN); Jing Zang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 561 days.

(21) Appl. No.: 14/455,765

(22) Filed: Aug. 8, 2014

(65) Prior Publication Data

US 2015/0127526 A1  May 7, 2015

Related U.S. Application Data

(63) Continuation of application No. PCT/CN2014/077157, filed on May 9, 2014.

(30) Foreign Application Priority Data

Nov. 6, 2013  (CN) .......................... 2013 1 0549432

(51) Int. Cl.
*G06Q 20/16* (2012.01)
*G06Q 20/10* (2012.01)
(Continued)

(52) U.S. Cl.
CPC ........... *G06Q 20/16* (2013.01); *G06Q 10/107* (2013.01); *G06Q 20/10* (2013.01); *G06Q 20/223* (2013.01); *G06Q 40/02* (2013.01); *G06Q 50/01* (2013.01)

(58) Field of Classification Search
CPC ...... G06Q 20/16; G06Q 10/107; G06Q 20/10; G06Q 20/223; G06Q 40/02; G06Q 50/01
(Continued)

(56) References Cited

U.S. PATENT DOCUMENTS 7,398,252 B2  7/2008  Neofytides et al.
8,224,700 B2 *  7/2012  Silver .................... G06Q 10/02
                                                        235/379
(Continued)

FOREIGN PATENT DOCUMENTS

CN  101079133 A  11/2007
CN  101211439 A  7/2008
(Continued)

OTHER PUBLICATIONS

Borzo, G. (May 8, 1995). Chin-wag, or the coming thing? American Medical News Retrieved from https://dialog.proquest.com/professional/docview/768207885?accountid=142257 (Year: 1995).*

(Continued)

*Primary Examiner* — Kito R Robinson
(74) *Attorney, Agent, or Firm* — Morgan, Lewis & Bockius LLP

(57) ABSTRACT

A method and device of requesting and receiving payment in a group chat environment are disclosed. The method includes: displaying a conversation interface of a group chat session for a pre-established conversation group, the pre-established conversation group including a user of the user device and a plurality of other users participating in the pre-established conversation group; providing, in the conversation interface of the group chat session, a control for requesting payment from the pre-established conversation group; detecting an input from the user invoking the control for requesting payment from the pre-established conversation group; and in response to detecting the input from the user, posting a group payment request as a chat message to the group chat session.

20 Claims, 12 Drawing Sheets

(51) Int. Cl.
*G06Q 20/22* (2012.01)
*G06Q 10/10* (2012.01)
*G06Q 40/02* (2012.01)
*G06Q 50/00* (2012.01)

(58) Field of Classification Search
USPC .......................................................... 705/39
See application file for complete search history.

(56) References Cited

U.S. PATENT DOCUMENTS

| | | | |
|---|---|---|---|
| 9,721,314 B2* | 8/2017 | Rose | G06Q 50/12 |
| 2004/0107144 A1* | 6/2004 | Short | G06Q 30/0613 705/26.41 |
| 2004/0133440 A1* | 7/2004 | Carolan | G06Q 10/10 705/38 |
| 2005/0043996 A1* | 2/2005 | Silver | G06Q 10/02 705/15 |
| 2009/0037286 A1* | 2/2009 | Foster | G06Q 20/20 705/21 |
| 2010/0030578 A1* | 2/2010 | Siddique | G06Q 10/0637 705/3 |
| 2010/0082481 A1* | 4/2010 | Lin | G06Q 20/042 705/41 |
| 2010/0121745 A1* | 5/2010 | Teckchandani | G06Q 10/00 705/30 |
| 2011/0313840 A1* | 12/2011 | Mason | G06Q 30/02 705/14.35 |
| 2011/0313897 A1* | 12/2011 | Mulakaluri | G06Q 20/10 705/30 |
| 2012/0143753 A1* | 6/2012 | Gonzalez | G06Q 20/12 705/41 |
| 2012/0143761 A1* | 6/2012 | Doran | G06Q 20/08 705/44 |
| 2012/0173396 A1* | 7/2012 | Melby | G06Q 20/102 705/34 |
| 2012/0185355 A1* | 7/2012 | Kilroy | G06Q 30/0633 705/26.8 |
| 2012/0209749 A1* | 8/2012 | Hammad | G06Q 30/06 705/27.1 |
| 2012/0226614 A1* | 9/2012 | Gura | G06Q 20/12 705/44 |
| 2012/0296742 A1* | 11/2012 | Patwa | G06Q 30/0242 705/14.54 |
| 2013/0073474 A1* | 3/2013 | Young | G06Q 10/00 705/319 |
| 2013/0085790 A1* | 4/2013 | Palmer | G06Q 10/02 705/5 |
| 2013/0110662 A1* | 5/2013 | Dezelak | G06Q 30/0613 705/26.1 |
| 2013/0117713 A1* | 5/2013 | Bauder | G06F 3/0482 715/810 |
| 2013/0215116 A1* | 8/2013 | Siddique | G06Q 30/0643 345/420 |
| 2013/0339452 A1* | 12/2013 | Shaikh | H04L 51/32 709/205 |
| 2014/0052633 A1* | 2/2014 | Gandhi | G06Q 20/38 705/44 |
| 2014/0058855 A1* | 2/2014 | Hussein | G06Q 20/405 705/16 |
| 2014/0058939 A1* | 2/2014 | Savla | G06Q 20/227 705/42 |
| 2014/0108233 A1* | 4/2014 | Yilgoren | G06Q 20/32 705/39 |
| 2014/0108235 A1* | 4/2014 | Chelst | G06Q 20/22 705/39 |
| 2014/0136349 A1* | 5/2014 | Dave | G06Q 20/20 705/16 |
| 2014/0164234 A1* | 6/2014 | Coffman | G06Q 20/14 705/40 |
| 2014/0172704 A1* | 6/2014 | Atagun | G06Q 40/02 705/44 |
| 2014/0180929 A1* | 6/2014 | Ohnishi | G06Q 20/38215 705/64 |
| 2014/0195424 A1* | 7/2014 | Zheng | G06Q 20/36 705/41 |
| 2014/0201067 A1* | 7/2014 | Lai | G06Q 20/027 705/39 |
| 2014/0351118 A1* | 11/2014 | Zhao | G06Q 20/3224 705/40 |
| 2015/0012341 A1* | 1/2015 | Amin | G07B 15/00 705/13 |
| 2015/0019308 A1* | 1/2015 | Wright | G06Q 30/0207 705/14.14 |
| 2015/0032567 A1* | 1/2015 | Bhatia | G06Q 30/06 705/26.8 |
| 2015/0120345 A1* | 4/2015 | Rose | G06Q 50/12 705/5 |
| 2015/0310408 A1* | 10/2015 | Anderson | G06Q 20/14 705/39 |
| 2016/0019472 A1* | 1/2016 | Javit | G06Q 10/02 705/5 |
| 2016/0042328 A1* | 2/2016 | Teckchandani | G06Q 10/00 705/44 |

FOREIGN PATENT DOCUMENTS

| | | |
|---|---|---|
| CN | 101941009 A | 1/2011 |
| CN | 102496222 A | 6/2012 |
| CN | 103036969 A | 4/2013 |
| CN | 103164792 A | 6/2013 |

OTHER PUBLICATIONS

Tencent Technology, PCT/CN2014/077157, ISR, Jul. 23, 2014, 3 pgs.
Tencent Technology, Written Opinion, PCT/CN2014/077157, dated Jul. 24, 2014, 4 pgs.
Tencent Technology, IPRP, PCT/CN2014/077157, May 10, 2016, 4 pgs.

* cited by examiner

METHOD, SYSTEM AND SERVER SYSTEM OF PAYMENT BASED ON A CONVERSATION GROUP

RELATED APPLICATIONS

This application is a continuation application of PCT Patent Application No. PCT/CN2014/077157, entitled "METHOD, SYSTEM AND SERVER SYSTEM OF PAYMENT BASED ON A CONVERSATION GROUP" filed on May 9, 2014, which claims priority to Chinese Patent Application No. 201310549432.3, entitled "METHOD, SYSTEM AND SERVER SYSTEM OF PAYMENT BASED ON A CONVERSATION GROUP," filed on Nov. 6, 2013, both of which are incorporated by reference in their entirety.

TECHNICAL FIELD

The present application relates to the technical field of communication platforms, and more particularly, to a method, system, and server system of payment based on a conversation group.

BACKGROUND

With the rapid development of network technologies, payment processing technologies on various types of networks are widely used in people's daily lives. For example, mobile banking technologies, UnionPay, POS system technologies, online banking, online shopping technologies, and so on are adopted in various fields such as transport, taxation, and financial securities and provide convenience to people's daily lives.

It is often occurred that a payment needs to be processed between a plurality of people. For example, when a group of people have a dinner at a restaurant together, the dinner bill may need to be shared among the ten people. Also, one person may receive charity donations from other people and donate the collection on behalf of the group. In addition, a person may sell certain products or services to other people.

It is therefore desirable to have a method to process payments among a group of people efficiently and flexibly.

SUMMARY

Current communication technologies provide people with a fast and efficient communication platform, where online users can implement fast and instant exchange of information, so that people can communicate with each other in a great number of communication manners. A conversation group is a group of users that have formed an online group over a communication platform (e.g., an instant messaging or chat platform), and are communicating with one another in the group using the communication methods (e.g., instant messages) provided on the communication platform. The key feature of a conversation group is that, the communication message from one group member to the group is directed to the whole group, so all other members of the group can see and respond to the message within the group conversation session. As disclosed in herein, a payment method involving multiple people can be performed using a conversation group that has already been formed. Forming a conversation group is an easy task using the group forming functions of a communication platform (e.g., an instant messaging platform). In fact, frequently, the group of users involved in the payment operation were already social contacts of one another on the communication platform and had already formed a conversation group before the need of payment arose. The method disclosed herein is capable of processing multiple payments simultaneously. A user can easily tailor the payment process to make it suitable for different settings and serving for various purposes. The method uses existing conversation interfaces of conversation groups so that the payment can be part of the communication among group members.

In accordance with some embodiments, a method of requesting and receiving payment in a group chat environment is performed at a user device having one or more processors and memory for storing one or more programs to be executed by the one or more processors. The method includes: displaying a conversation interface of a group chat session for a pre-established conversation group, the pre-established conversation group including a user of the user device and a plurality of other users participating in the pre-established conversation group; providing, in the conversation interface of the group chat session, a control for requesting payment from the pre-established conversation group; detecting an input from the user invoking the control for requesting payment from the pre-established conversation group; and in response to detecting the input from the user, posting a group payment request as a chat message to the group chat session.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF THE DRAWINGS

The aforementioned features and advantages of the application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
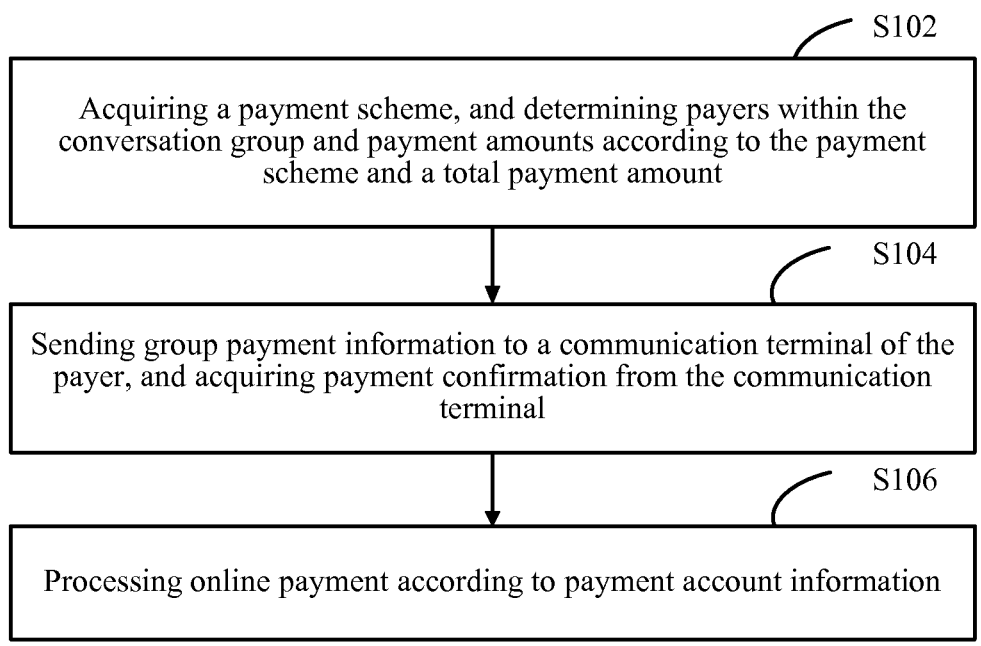
FIG. 1 is a flow chart of requesting and providing payment based on a conversation group in accordance with some embodiments.

FIG. 1 is a schematic flow chart of a conversation group-based online payment method in accordance with some embodiments.

The process of the conversation group-based online payment method in some embodiments includes the following steps.

In accordance with some embodiments, in step S102, when a group payment request sent to a conversation group is received, a server acquires a payment scheme corresponding to the conversation group. The group payment request at least includes a communication identifier of the instant conversation group and a total payment amount. In some embodiments, the server determines payers within the conversation group and payment amounts according to the payment scheme and the total payment amount.

In accordance with some embodiments, in step S104, the server sends group payment message(s) to a communication terminal (a user device) of the payer(s), and acquires payment confirmation(s) from the payer(s) in a group conversation interface. The payment message and the payment confirmation are displayed in the group conversation interface as messages originated from the requestor and the payer(s), respectively. In some embodiments, the payment message from the requestor is displayed as a single message posted to the group. In some embodiments, the payment message from the requestor is displayed as individual messages to each respective payer. In some embodiments, the if only a single payer is identified, the payment message and the payment confirmation message can be send as private messages between the payment requestor and the payer in a one-on-one conversation interface.

In accordance with some embodiments, in step S106, the server processes online payment according to payment account information of the payer. For example, the payment account of the payer can be a bank account, a credit card account, or other types of payment account previously linked with the payer's user account at the communication server.

In general, a conversation group is a virtual organization formed of a plurality of users on a communication platform (e.g., an instant messaging platform, or a chat platform, a gaming platform, or other types of social networking platform that provides real-time or semi-real-time group conversations in an established group of members). The conversation group has its own independent communication identifier, and all users of the conversation group can receive group information sent through the communication identifier.

In some embodiments, the group payment request may be sent by a communication terminal that logs into the conversation group, or may also be sent by a seller that acts as a payee to the conversation group through a communication platform. The communication terminal may log into the communication platform, open the conversation group, invoke a group payment function button in a communication interface of the conversation group, set relevant information such as a payment amount and theme (e.g., the reason for the payment, such as dinner on Saturday, donation to children's hospital, gas money for shared rides, etc.), and send the group payment request. The group payment request may include one or more pieces of the following information: a payment theme, a total payment amount, a communication identifier of the conversation group, and the payment scheme of the conversation group.

In accordance with some embodiments, the group payment request may further include account information of a payee or a communication identifier of a payee. Through the account information of the payee, a sum of money paid by the payer can be transferred to an account of the payee. According to an identifier of the payee, receipt confirmation information can be sent to the communication terminal of the payee. The payee may or may not be a group member in some embodiments.

In a preferred implementation manner, after the group payment request to the conversation group is received, a server determines whether a communication identifier of a communication terminal that sends the group payment request is a social network contact of (e.g., has a friend relationship with) at least one of other group members. If yes, the server determines that the group payment request is valid, and otherwise, determines that the request is invalid.

Through verifying whether the communication identifier of the communication terminal has a social network relationship (e.g., friend relationship) with other group members, a user that is not a social network contact (e.g., a friend) is prevented from joining the conversation group to obtain a group user identity to send a group payment request at will or maliciously. This prevention measure will enhance the safety of group payment operations.

In accordance with some embodiments, after the group payment request is received, the payment scheme of the conversation group may be acquired in various manners. A payment scheme is a scheme that is used to determine how the potential or actual payers are supposed to divide the paying responsibility for the requested payment amount. For example, whether one or some other subset of person(s) is going to pay the whole amount, whether everyone will divide the payment amount equally or according to predetermined proportions, whether the potential payers are to compete for paying, or trying to avoid paying through some actions, etc. A corresponding payment scheme may be preset in a server for a conversation group. A payment scheme may also be set in a group payment request. A payment scheme setting interface may be provided to a communication terminal of an instant conversation group (including the communication terminal that initiates the group payment request or other communication terminals) to receive an input of the communication terminal to set the payment scheme.

In a preferred implementation manner, the acquiring the payment scheme of the conversation group includes: acquiring a communication identifier of the conversation group from the group payment request, and searching for the payment scheme corresponding to the communication identifier of the conversation group saved in a server in advance according to the communication identifier of the conversation group; or, receiving the group payment request sent to the conversation group, wherein the group payment request further includes a specified payment scheme and directly acquiring the specified payment scheme from the group payment request.

After the payment scheme of the conversation group is obtained, according to the payment scheme, a communication identifier of the payer within the conversation group and a corresponding payment amount is determined. The communication identifier may be an identity identifier such as an account number or communication number in a communication platform.

In some embodiments, the payment scheme of the conversation group includes: all group members in the conversation group are payers, and a payment amount of each payer is an average value from dividing a total payment amount by the number of group members.

In some embodiments, the payment scheme of the conversation group includes: a payer is determined according to a preset group user payment priority.

In some embodiments, the payment scheme of the conversation group includes: a payment amount of each payer is determined according to a preset payment proportion of each group user.

In some embodiments, the payment scheme of the conversation group includes: a payer of current payment is determined according to a preset payment order and a payment history record.

The payment scheme of the conversation group is not limited to the foregoing types, and a person skilled in the art may set other payment schemes according to the concept and a specific group payment demand. Also, the payment schemes listed above may also be combined, for example, a payer is first determined according to a preset group user payment priority, and a payment amount of each payer is then determined according to a preset payment proportion of each group user.

In an implementation manner, the payment scheme of the conversation group further includes: receiving bill-grabbing request information and determining the earliest communication terminal that sends the bill-grabbing request information as a payer. In some embodiments, the group of users can also compete to reject the payment request, and the one or one users that sent in their rejections the last, will be chosen as the actual payers and divide the bill among themselves.

This implementation manner allows a group user of a conversation group to obtain a payment right in a bill-grabbing (that is, first-in, first served) manner. Specifically, after a group payment message is opened, an bill-grabbing button is set in a communication interface of the conversation group, and when the bill-grabbing button is triggered on individual user terminals, bill-grabbing request information is sent from the user terminal and received by the server, and the earliest user terminal that sends the bill-grabbing request information is set as a payer.

After an identifier of a payer and a corresponding payment amount are acquired, a server sends a group payment message to the payer and acquires payment confirmation from the payer. The group payment message may include information such as a payment theme, a payment amount, and a payee. The group payment message may be separately sent to the communication terminal of each payer, or may also be sent to a corresponding conversation group in a group message manner.

In a preferred implementation manner, the step of sending a group payment message to the communication terminal of the payer and acquiring payment confirmation from the communication terminal of the payer may be implemented in the following manner: according to payer communication identifiers, sending a corresponding payment information to each payer, and when the payer invokes the payment message, confirming with the communication terminal of the payer.

After a communication terminal invokes payment message, the communication terminal displays a payment interface to confirm payment amount. In this implementation manner, the payment message is invisible to other group members, thereby ensuring the secrecy of payment information and protecting the privacy of a user.

In another preferred implementation manner, according to the communication identifier of the instant conversation group, the group payment message is posted as a group message.

When a communication terminal of the conversation group invokes the group payment message, a server determines whether its communication identifier is a communication identifier of a payer, and if yes, confirming with the communication terminal of the payer.

By posting the group payment message to the conversation group as a group message, the group payment message becomes instantly visible to all group members without being sent separately. When a communication terminal of the conversation group invokes the group payment message, a server determines whether its communication identifier is a communication identifier of a payer defined by the payment scheme. For example, the payment scheme is that a payer is determined according to a preset payment order and a payment history record. However, according to a payment history record, payment is completed on a communication terminal A at one time, and a repeated payment violates the payment scheme.

In the above two implementation manners a payment interface to confirm the amount may be sent to the communication terminal of the payer, wherein the payment interface includes a corresponding payment amount and a verification code input box. After the communication terminal of the payer requests a verification code, a verification code is sent to the communication terminal of the payer. Next, a verification code input in the payment interface is received, the sent verification code and the received verification code are compared, and if they are consistent, the server completes payment confirmation.

Furthermore, in some embodiments a search is made in a server according to the communication identifier of the payer to find whether corresponding payment account information exists. If yes, a server acquires the corresponding payment account information and confirms with the communication terminal of the payer. If not, a server sends a payment account set-up link to the communication terminal. After a payment account is set up, the server confirms payment with the payer according to the corresponding payment account information. That is, before payment confirmation, it is first determined whether a payment account is set up, and if not, a user is guided to set up a payment account first.

After payment confirmation from the communication terminal of the payer is acquired, a server processes online payment according to payment account information of the payer.

The corresponding relationship between the communication identifier of the payer and payment account information may be saved in a backend server, and a communication terminal may log into the backend server to change or remove an existing corresponding relationship or add a corresponding relationship.

Figure 2:
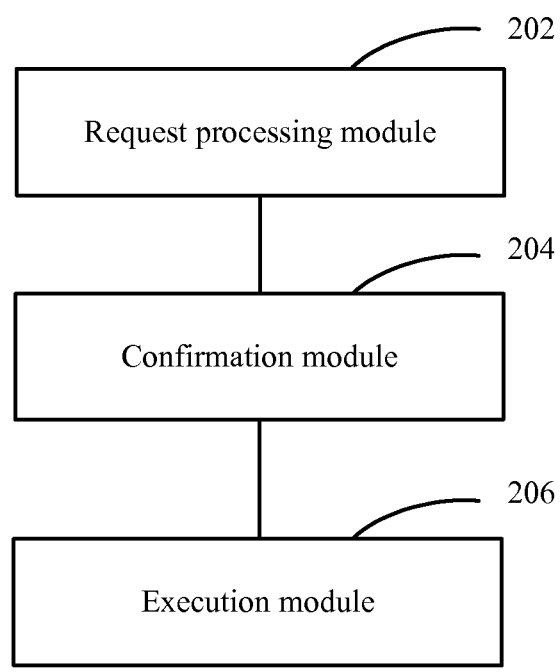
FIG. 2 is a structural diagram of requesting and providing payment based on a conversation group in accordance with some embodiments.

FIG. 2 is a schematic structural view of a conversation group-based online payment server system in accordance with some embodiments.

The conversation group-based online payment server system in some embodiments includes the following modules and units.

A request processing module 202 is configured to acquire a payment scheme corresponding to the conversation group, wherein the group payment request at least includes a communication identifier of the instant conversation group and a total payment amount, and to determine a payer and a payment amount.

A confirmation module 204 is configured to send group payment message to a communication terminal of the payer, and acquire payment confirmation from the communication terminal of the payer.

An execution module 206 is configured to process online payment according to payment account information of the payer.

The group payment request may be sent by a communication terminal that logs into the conversation group, or may also be sent by a seller that acts as a payee to the instant conversation group through a communication platform. The communication terminal may log into the communication platform, open the conversation group, invoke a group payment function button in a corresponding communication interface of the conversation group, set relevant information such as a payment amount and theme, and send the group payment request. The group payment request may include one or more pieces of the following information: a payment theme, a total payment amount, a communication identifier of the conversation group, and the payment scheme of the conversation group. The group payment request may further include account information of a payee or an identifier of a payee. Through the account information of the payee, a sum of money paid by the payer can be transferred to an account of the payee. According to the identifier of the payee, receipt confirmation information can be sent to the communication terminal of the payee. The payee may or may not be a group member.

In a preferred implementation manner, the request processing module 202 determines, after the group payment request to the conversation group is received, whether a communication identifier of a communication terminal that sends the group payment request has a friend relationship with at least one of other group members. If yes, a server determines that the group payment request is valid, and otherwise, a server determines that the group payment request is invalid.

Through verifying whether the communication identifier of the communication terminal has a friend relationship with other group members, a user that is not a friend is prevented from joining the conversation group to obtain a group user identity to send a group payment request at will or maliciously, thereby enhancing the safety of group payment operations.

The request processing module 202 acquires, after the group payment request is received, the payment scheme corresponding to the conversation group.

The payment scheme of the conversation group may be acquired in various manners: a corresponding payment scheme may be preset in a server for a conversation group; a payment scheme may also be set in a group payment request; or a payment scheme setting interface may be provided to a communication terminal of an instant conversation group (including the communication terminal that initiates the group payment request or other communication terminals) to receive an input of the communication terminal to set the payment scheme.

In a preferred implementation manner, the request processing module 202 acquires a communication identifier of the conversation group from the group payment request, and searches for the payment scheme corresponding to the communication identifier of the conversation group saved in a server in advance according to the communication identifier of the conversation group; or, the request processing module 202 receives the group payment request sent to the conversation group, wherein the group payment request further includes a specified payment scheme, and directly acquires the specified payment scheme from the group payment request.

The request processing module 202 determines a communication identifier of a payer within the conversation group according to the payment scheme, and a payment amount. The communication identifier may be an identity identifier such as an account number or communication number in a communication platform.

The payment scheme of the conversation group may include the following embodiments.

In some embodiments, all group members in the conversation group are payers, and a payment amount of each payer is an average value from dividing a total payment amount by the number of group members.

In some embodiments, a payer is determined according to a preset group user payment priority.

In some embodiments, a payment amount of each payer is determined according to a preset payment proportion of each group user.

In some embodiments, a payer of current payment is determined according to a preset payment order and a payment history record.

The payment scheme of the conversation group is not limited to the foregoing types, and a person skilled in the art may set other payment schemes according to the concept and a specific group payment demand. Also, the payment schemes listed above may also be combined, for example, a payer is first determined according to a preset group user payment priority, and a payment amount of each payer is then determined according to a preset payment proportion of each group user.

In an implementation manner, the payment scheme of the conversation group further includes: receiving order-grabbing application information and determining the earliest communication terminal that sends the order-grabbing application information as a payer.

This implementation manner allows a group user of a conversation group to obtain a payment right in a bill-grabbing (that is, first-in, first-served) manner. Specifically, after a group payment message is opened, a bill-grabbing button is set in a communication interface of the conversation group, and when the bill-grabbing button is triggered, bill-grabbing request information is received, and the earliest communication terminal that sends the bill-grabbing request information is set as a payer.

The request processing module 202 acquires an identifier of a payer and a corresponding payment amount, and the confirmation module 204 then sends the group payment message to the communication terminal of the payer, and acquires payment confirmation from the payer. The group payment message may include information such as a payment theme, a payment amount, and a payee. The group payment message may be separately sent to the communication terminal of each payer, or may also be sent to a corresponding conversation group in a group message manner.

In a preferred implementation manner, the confirmation module 204 may send a payment message of a corresponding amount to the communication terminal of each payer, and when the payer invokes the payment information, confirms payment with the payer.

After a communication terminal invokes payment message, the communication terminal displays a payment interface to confirm payment amount. In this implementation manner, the payment message is invisible to other group members, thereby ensuring the secrecy of payment information and protecting the privacy of a user.

In another preferred implementation manner, the confirmation module 204 sends the group payment message to the conversation group in a group information manner. And when a communication terminal of the conversation group invokes the group payment message, the confirmation module 204 determines whether its communication identifier is a communication identifier of a payer, and if yes, confirms payment with the payer.

By posting the group payment message to the conversation group as a group message, the group payment message becomes instantly visible to all group members without being sent separately. When a communication terminal of the conversation group invokes the group payment message, a server determines whether its communication identifier is a communication identifier of a payer defined by the payment scheme. For example, the payment scheme is that a payer of current payment is determined according to a preset payment order and a payment history record; however, according to a payment history record, payment is completed on a communication terminal A at one time, and a repeated payment violates the payment scheme.

In the above two implementation manners a payment interface to confirm the amount may be sent to the communication terminal of the payer. After the communication terminal of the payer requests a verification code, a verification code is sent to the communication terminal of the payer. A verification code input is then received in the payment interface. The sent verification code and the received verification code are compared. Furthermore, the confirmation module 204 searches in a server according to the communication identifier of the payer to find whether corresponding payment account information exists, and if yes, acquires corresponding payment account information, and confirms payment with the payer; if not, sends a account set-up link, sets up an account, and then confirms payment with the payer according to the corresponding payment account information. That is, before payment confirmation, it is first determined whether a payment account is set up, and if not, a user is guided to set up a payment account first.

The confirmation module 204 acquires payment confirmation from the payer, and the execution module 206 then processes online payment according to payment account information of the payer.

The corresponding relationship between the communication identifier of the payer and payment account information may be saved in a backend server, and a communication terminal may log into the backend server to change or remove an existing corresponding relationship or add a corresponding relationship.

Figure 3:
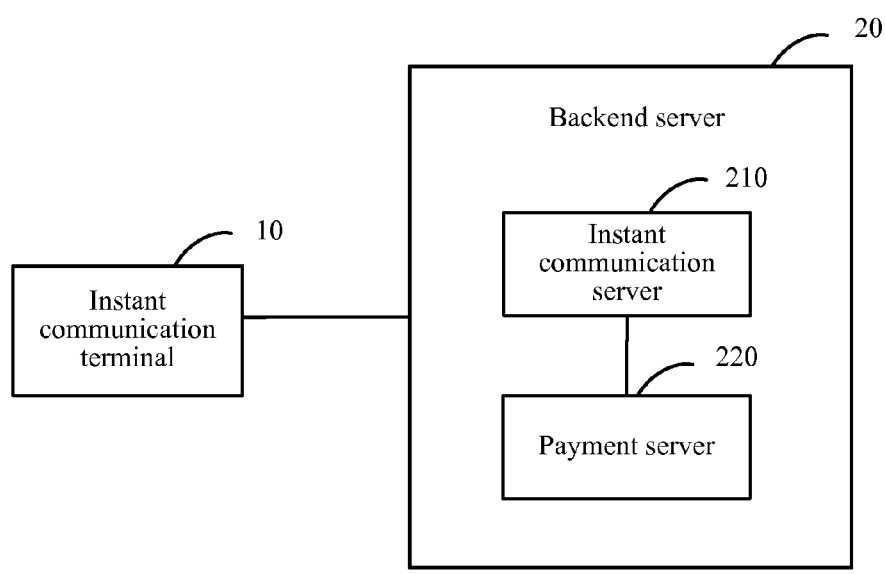
FIG. 3 is a structural diagram of requesting and providing payment based on a conversation group in accordance with some embodiments.

FIG. 3 is a schematic structural view of a conversation group-based online payment system in accordance with some embodiments.

The conversation group-based online payment system in some embodiments includes: a communication terminal 10 and a backend server 20.

The backend server 20 is configured to acquire a payment scheme corresponding to the conversation group, to determine a communication identifier of a payer and a payment amount, to send group payment message to a communication terminal of the payer, to confirm payment with the communication terminal of the payer, and to process online payment according to payment account information of the payer.

The communication terminal 10 is configured to receive the group payment message, and perform payment confirmation according to the group payment message.

The communication terminal 10 may be a device such as a mobile terminal, a personal computer, a tablet computer, a smartphone, a gaming device, or a digital television that has a communication function or is installed with communication software, and is preferably a mobile terminal installed with instant communication software (e.g., a social network client application, an instant messaging client application, etc.).

The backend server 20 may be a single server having both a communication service function and a payment service function, and may also be formed of several servers having a communication service function and servers having a payment service function.

In some embodiments, the backend server 20 includes a communication server 210 and a payment server 220.

The communication server 210 is configured to acquire the payment scheme corresponding to the conversation group, wherein the group payment request at least includes a communication identifier of the instant conversation group and a total payment amount, to determine a payer and a payment amount, to send the group payment message to a communication terminal of the payer, and confirm payment with the communication terminal of the payer.

In some embodiments, the payment server 220 is configured to process online payment according to payment account information of the payer.

The communication server 210 is further configured to receive log-in of the communication terminal 10, and perform identity verification on a communication identifier with which the communication terminal 10 signs in, so as to implement communication between the instant communication terminals 10, save information about the conversation group and the corresponding payment scheme. The communication terminal 10 may log into the communication server 210 to set the payment scheme of the conversation group.

Figure 4:
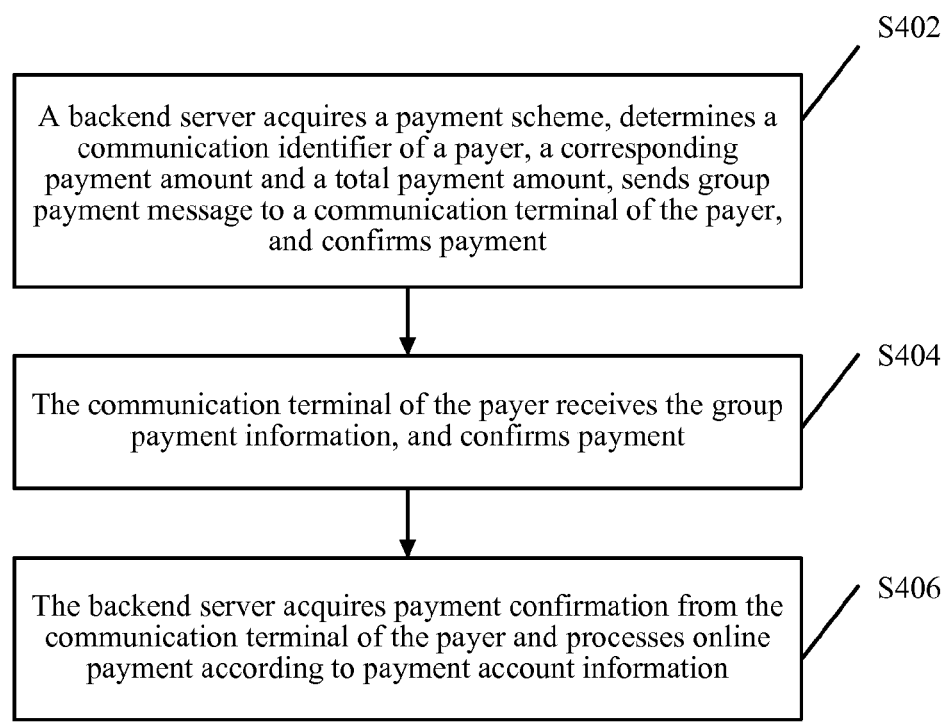
FIG. 4 is a flow chart of requesting and providing payment through a conversation group in accordance with some embodiments.

FIG. 4 is a schematic flow chart of an online payment method implemented by a conversation group-based online payment system in accordance with some embodiments.

The conversation group-based online payment method in some embodiments includes the following steps.

In accordance with some embodiments, in step S402, a backend server acquires the payment scheme corresponding to the conversation group, wherein the group payment request at least includes a communication identifier of the instant conversation group and a total payment amount, determines a payer and a corresponding payment amount, sends group payment message to a communication terminal of the payer, and confirms payment.

In accordance with some embodiments, in step S402, the communication terminal of the payer receives the group payment message, and confirms payment according to the group payment message.

In accordance with some embodiments, in step S402, the backend server performs online payment processing according to payment account information of the payer.

In some embodiments, the group payment request for the conversation group may be sent by the communication terminal 10 to the backend server 20. The communication terminal 10 may log into the communication server 210 to invoke a group payment message in the corresponding conversation group, and send, after relevant setting, the group payment request to the communication server 210. The group payment request may also be sent by a seller that acts as a payee to the conversation group through a communication platform.

In some embodiments, the group payment request may include one or more pieces of the following information: a payment theme, a total payment amount, a communication identifier of the conversation group, and the payment scheme of the conversation group.

The group payment request may further include account information or a communication identifier of a payee. The backend server 20 may transfer a sum of money paid by a payer to an account of the payee through the account information of the payee. According to the communication identifier of a payee, receipt confirmation information can be sent to the communication terminal of the payee. The communication identifier of the payee may be a communication identifier of the conversation group, that is, the payee may or may not be a group member.

As a manner of generating the group payment request, the communication terminal 10 may open a payment scheme setting interface, receive input information, and send, after a user clicks to confirm, the group payment request.

In some embodiments, the communication terminal 10 may further acquire information such as a payment theme, a total payment amount, and a payee's account in an electronic bill in a manner of scanning a corresponding 2D code without having to manually input relevant information to set the group payment request.

In a preferred implementation manner, the communication server 210 determines whether the communication identifier of the communication terminal 10 that sends the group payment request has a friend relationship with at least one of other communication identifiers in the conversation group. If yes, the communication server 210 determines that the group payment request is valid, and otherwise, determines that the group payment request is invalid.

Through verifying whether the communication identifier of the communication terminal has a friend relationship with other group members, a user that is not a friend is prevented from joining the conversation group to obtain a group user identity to send a group payment request at will or maliciously, thereby enhancing the safety of group payment operations.

In some embodiments, the backend server 20 determines, after receiving the group payment request, the payment scheme of the conversation group according to the group payment request.

The payment scheme of the conversation group may be acquired in various manners: a corresponding payment scheme may be preset in a server for a conversation group; a payment scheme may also be set in a group payment request; or a payment scheme setting interface may be provided to a communication terminal of an instant conversation group (including the communication terminal that initiates the group payment request or other communication terminals) to receive an input of the communication terminal to set the payment scheme.

In a preferred implementation manner, that the backend server 20 receives the group payment request sent to the conversation group, and determines the payment scheme of the conversation group according to the group payment request includes the one or more of the following steps.

In some embodiments, the backend server 20 acquires a communication identifier of the conversation group from the group payment request, and searches for the payment scheme corresponding to the communication identifier of the conversation group saved in a server in advance according to the communication identifier of the conversation group.

In some embodiments, the backend server 20 receives the group payment request sent to the conversation group, wherein the group payment request further includes a specified payment scheme; and directly acquires the specified payment scheme from the group payment request.

The backend server 20 determines a communication identifier of a payer within the conversation group and a corresponding payment amount according to the payment scheme. The communication identifier may be an identity identifier such as an account number or communication number in a communication platform.

The backend server 20 sends group payment message to the communication terminal of the payer, and acquires payment confirmation from the payer. The group payment message may include information such as a payment theme, a payment amount, and a payee. The group payment message may be separately sent to the communication terminal of each payer, or may also be sent to a corresponding conversation group in a group message manner.

The corresponding communication terminal 10 performs payment confirmation according to the group payment message.

In another preferred implementation manner, the backend server 20 sends payment information of a corresponding amount to the communication terminal of each payer according to payer communication identifiers, and performs, when the payer invokes the payment information, payment confirmation with the communication terminal of the payer.

After invoking a payment message, the communication terminal displays a payment interface to confirm payment amount. In this implementation manner, the payment message is invisible to other group members, thereby ensuring the secrecy of payment information and protecting the privacy of a user.

In a preferred implementation manner, the backend server 20 posts the group payment message to the conversation group as a group message according to the communication identifier of the instant conversation group, determines whether its communication identifier is a communication identifier of a payer, and if yes, confirms payment with the payer.

By posting the group payment message to the conversation group as a group message, the group payment message becomes instantly visible to all group members without being sent separately. When a communication terminal of the conversation group invokes the group payment message, a server determines whether its communication identifier is a communication identifier of a payer defined by the payment scheme. For example, the payment scheme is that a payer of current payment is determined according to a preset payment order and a payment history record; however, according to a payment history record, payment is completed on a communication terminal A at one time, and a repeated payment violates the payment scheme.

In the above two implementation manners a payment interface to confirm the amount may be sent to the communication terminal of the payer. After the communication terminal of the payer requests a verification code, a verification code is sent to the communication terminal of the payer. A verification code is then input in the payment interface is received, the sent verification code and the received verification code are compared, and if they are consistent, payment confirmation is accomplished.

Furthermore, the backend server 20 searches in a server according to the communication identifier of the payer to find whether corresponding payment account information exists, and if yes, acquires the corresponding payment account information, and confirms payment with the payer; if not, sends a account set-up link, sets up an account, and then confirms payment with the payer according to the corresponding payment account information. That is, before payment confirmation, it is first determined whether a payment account is set up, and if not, a user is guided to set up a payment account first.

The backend server 20 may be configured to save an existing corresponding relationship between a communication identifier and payment account information, and allow a user to add a new corresponding relationship or remove an existing corresponding relationship; this part of function is usually implemented by the payment server 220.

The setting of the corresponding relationship of payment account information usually requires payment account information and identity information corresponding to a payment account. Therefore, the setting-up of the payment account may be implemented in the following manner: the communication terminal 10 of the payer opens an account set-up link, acquires payment account information and identity information input in the account set-up link, and sends the payment account information and the identity information to the backend server. The backend server 20 verifies the validity and consistency of the payment account information and the identity information, and sets up the payment account for the communication identifier.

In a general payment scenario, the payment account information is usually bank card information such as a bank card number, a bank card valid time, and a credit card VCC code. The identity information is usually identity document information of a user, for example, an identity number. The payment account information and the identity information may be manually input by a user, or may also be automatically acquired by the instant communication terminal in other manners.

In a preferred implementation manner, the payment account information and identity information input in the account set-up link are acquired in the following manners:

The communication terminal of the payer triggers the account set-up link, opens a payment account binding page, scans a bank card with an image sensor to recognize account number information of the bank card, and then fills the account number information into a payment account information input box on the payment account binding page; and/or, the communication terminal of the payer triggers the account set-up link, opens a payment account binding page, scans an identity document with an image sensor to recognize identity information recorded in the identity document, and then fills the identity information in an identity information input box on the payment account binding page.

In the above manner, through scanning a card number and a document number of a bank card and an identity document, corresponding account number information and identity information may be directly obtained and automatically filled in an input box without requiring manually input, making the entire payment process more convenient and faster.

The backend server 20 performs, after payment confirmation from the communication terminal of the payer is acquired, online payment processing according to payment account information of the payer.

On the basis of the above conversation group-based online payment method and payment system, the present application further provides an example of the structure of a communication terminal and a server for implementing the conversation group-based online payment method and payment system. The structure of a communication terminal and a server is only an example applicable to a computer environment, which should not be regarded as proposing any limitations on the usage, and also should not be explained to be dependent upon or have a combination of one or more members in an exemplary computer system shown in the drawings.

Figure 5:
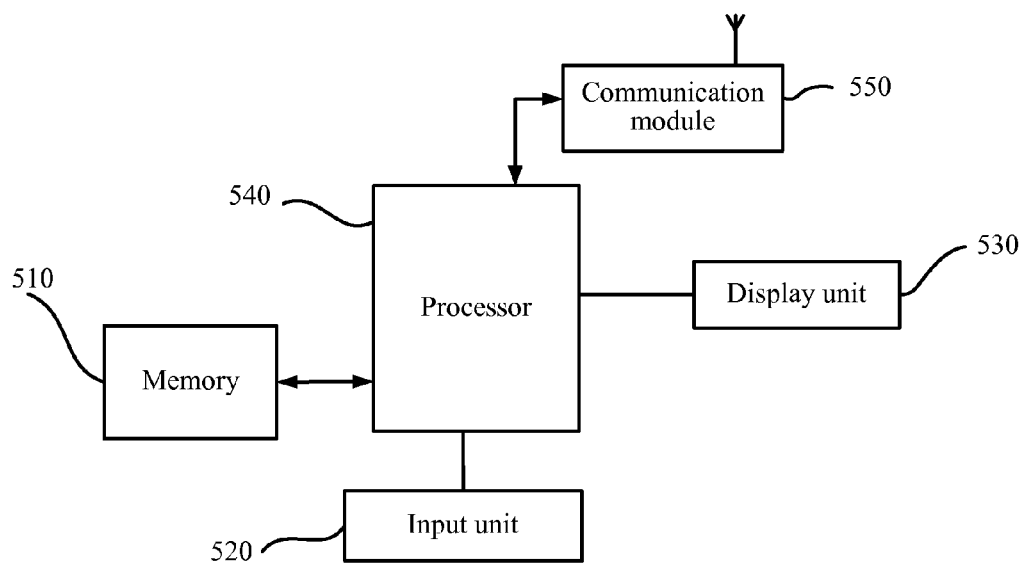
FIG. 5 is a structural diagram of requesting and providing payment based on a conversation group in accordance with some embodiments.

FIG. 5 is a block diagram of a part of the structure of an exemplary communication terminal for performing the methods described herein in accordance with some embodiments. The communication terminal may be any possible communication terminal, such as a mobile phone, a tablet computer, a Personal Digital Assistant (PDA), a Point of Sales (POS), and an on-board computer, that needs to upgrade and update relevant software.

Referring to FIG. 5, the communication terminal includes a memory 510, an input unit 520, a display unit 530, a processor 540, and a communication module 550.

The memory 510 may be configured to store a software program and a module. The processor 540 runs the software program and module stored in the memory 510 to execute various function applications and data processing relevant to the communication terminal. The memory 510 mainly includes a program storage area and a data storage area. The program storage area may store an operating system, an application program required for at least one function (for example, an audio playing function, an image playing function, and so on), and so on. The data storage area stores data created according to the use of the communication terminal. In addition, the memory 510 includes a high-speed random access memory, and may further include a non-volatile memory, for example, at least one disk storage device, a flash memory device, or other volatile solid storage devices.

The input unit 520 may be configured to receive an input digit, character or other information, and generate a key signal input relevant to user setting and function control of the communication terminal. Specifically, in the solution in the embodiment, the input unit 520 may input a communication identifier of a conversation group and performs operations such as clicking to trigger and confirming on group payment message.

Specifically, for example, when the communication terminal is a mobile phone, the input unit 520 may include a touch control panel and other input devices. The touch control panel, which is also referred to as a touch screen, can collect a touch operation of a user on or near the touch screen (for example, an operation of a user on the touch control panel or near the touch control panel by using any suitable object or attachment such as a finger and a stylus), and drive a corresponding connection apparatus according to a preset program. In addition to the touch control panel, the input unit 520 may further include other input devices. Specifically, other input devices may include, but is not limited to, one or more of a physical keyboard, a functional key (such as a volume control button and a switch button), a trackball, a mouse, and a joystick.

The display unit 530 is configured to display information input by the user or information and various menus provided to the user. The display unit 530 includes a display panel, and optionally, may adopt a liquid crystal display (LCD), an organic light-emitting diode (OLED), and other forms to configure the display panel. Specifically, in some embodiments, the display unit 330 may display the communication interface of the conversation group, the setting interface of a payment scheme, the group payment message, and so on for the user to view and perform a corresponding operation.

In some embodiments, the communication terminal can implement communication with the server with the communication module 550. The communication module 550 may be implemented by adopting any possible manner, such as a WiFi module, Bluetooth communication, and optical fiber communication. The communication module 550 enables the communication between the communication terminal and the server, so as to enable the communication terminal to send relevant information to the server (for example, the server sends a group payment request, setting information of the payment scheme or confirmation information of a payment amount in the embodiment), and receive relevant information sent by the server (for example, the group payment message sent by the server, and so on).

The processor 540 is a control center of the communication terminal. The parts of the entire communication terminal are connected by using various interfaces and circuits. Overall monitoring of the communication terminal is performed through running or executing a software program and/or module stored in the memory 510, invoking data stored in the memory 510, and executing various functions and data processing of the communication terminal. Optionally, the processor 540 may include one or more processing units.

Figure 6:
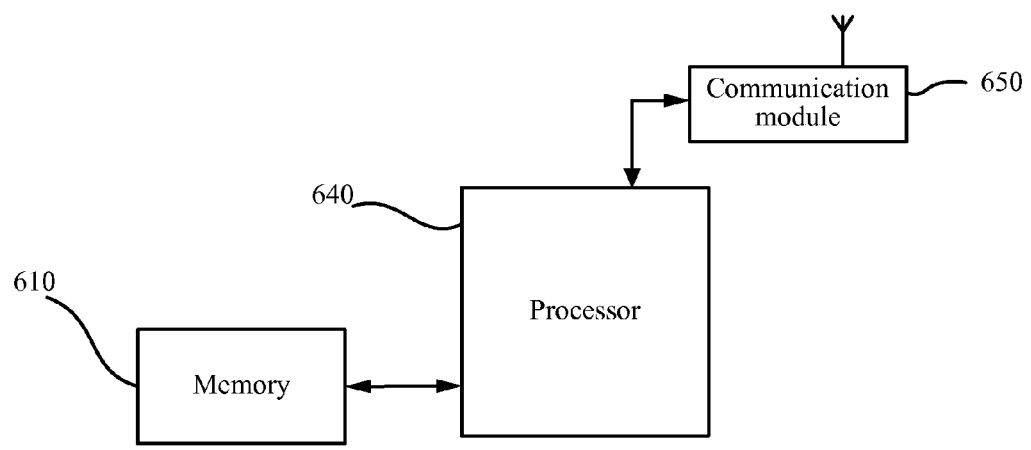
FIG. 6 is a structural diagram of requesting and providing payment based on a conversation group in accordance with some embodiments.

Similarly, FIG. 6 shows the structure of the framework comprised in a backend server in a specific example. Referring to FIG. 6, the backend server includes: members such as a memory 610, a processor 640, and a communication module 650.

The memory 610 is configured to store software programs and modules. The processor 640 is configured to run the software programs and modules stored in the memory 610 to execute various function applications and data processing relevant to the backend server, for example, processing the group payment request, determining a corresponding communication identifier and payment amount of a payer, generating group payment message, and so on. The memory 610 mainly includes a program storage area and a data storage area. The program storage area is configured to store an operating system and an application program required for at least one function. The data storage area is configured to store data created according to the use of the server.

In some embodiments, the backend server enables communication with the communication terminal with the communication module 650. The communication module 650 can be implemented by adopting any possible manner, such as a WiFi module, Bluetooth communication, and optical fiber communication. The communication between the communication terminal and the backend server is implemented by the communication module 650, so as to enable the backend server to receive relevant information sent by the communication terminal (such as a group payment request and confirmation information for group payment message), and return to the communication terminal information relevant to the communication terminal (such as delivering group payment message).

The processor 640 is a control center of the backend server. The parts of the entire backend server are connected by using various interfaces and circuits. Overall monitoring of the backend server is performed through running or executing the software program and/or module stored in the memory 610, invoking data stored in the memory 610, and executing various functions and data processing in the backend server. Optionally, the processor 640 is configured to include one or more processing units.

Figure 7:
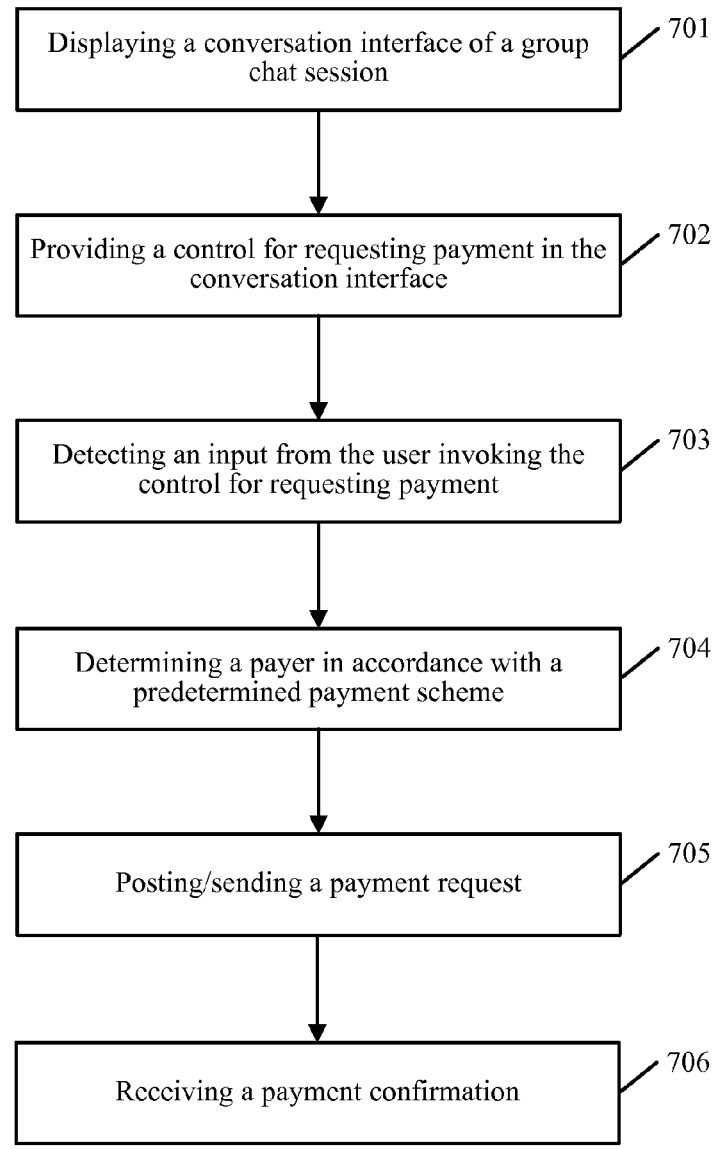
FIG. 7 is a flow chart of requesting and providing payment through a conversation group in accordance with some embodiments.
Figure 8A:
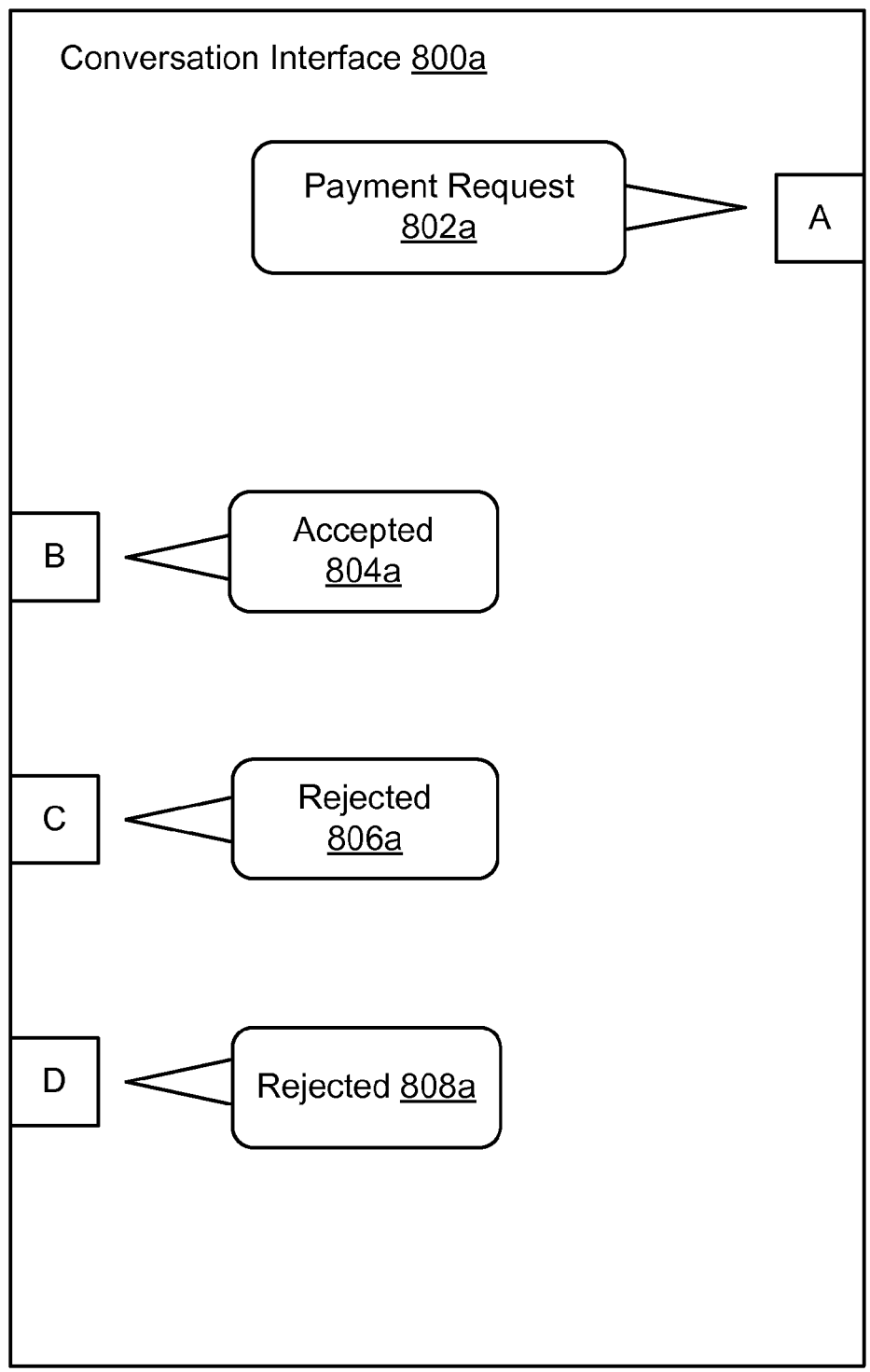
FIGS. 8A and 8B show user interfaces when a payment request is being processed within a conversation group in accordance with some embodiments.
Figure 8B:
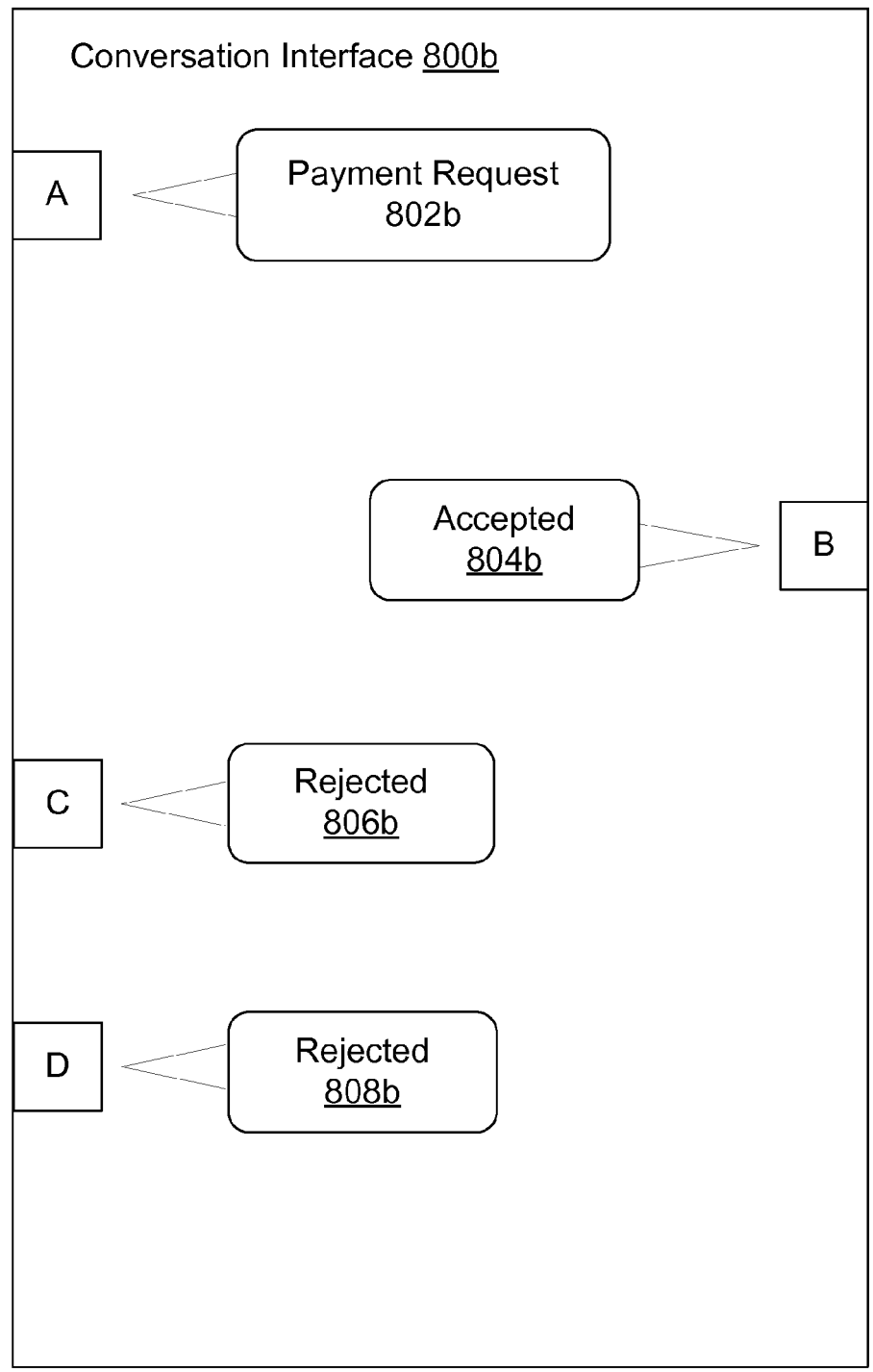

FIG. 7 is a flowchart of a method requesting and providing payment based on a conversation group in accordance with some embodiments. The method is performed at a user device (e.g., a communication terminal) having one or more processors and memory storing instructions for execution by the one or more processors. FIGS. 8A and 8B show exemplary user interfaces when a payment request is being processed within a conversation group in accordance with some embodiments.

In accordance with some embodiments, in step 701, the user device displays a conversation interface of a group chat session for a pre-established conversation group. In accordance with some embodiments, the pre-established conversation group includes a user of the user device ("the starting user" or payment requestor, or payee) and a plurality of other users participating in the pre-established conversation group. In some embodiments, the conversation group is organized within a message application or program that all participating users are using, although the participating users may use different kinds of user devices or different versions of the application or program.

In accordance with some embodiments, a conversation group includes at least two users and every user is able to post a message in the conversation interface for all other group members to see. In some embodiments, a conversation group includes at least three users and every user is able to post a message in the conversation interface for all other group members to see.

In accordance with some embodiments, in step 702, the user device provides, in the conversation interface of the group chat session, a control for requesting payment from the pre-established conversation group.

In accordance with some embodiments, the control for requesting payment is a function that is integrated within the message application or program. In some embodiments, when a conversation group is established and displayed, the control for requesting payment is provided to the conversation group. In some embodiments, the control for requesting payment is displayed as an icon within the conversation interface of the conversation interface of a group chat session.

In accordance with some embodiments, in step 703, the user device detects an input from the user invoking the control for requesting payment from the pre-established conversation group. In some embodiments, the control can be invoked by certain operation from the user, including voice instruction, clicking an icon then selecting from a menu, certain predetermined gestures, etc.

In some embodiments, in response to detecting the input from the user, the user device displays a payment request interface that is configured to receive an input of payment requirement information from the user.

In some embodiments, the payment interface is displayed in the respective conversation interface. In some embodiments, after detecting an input from the user invoking the control, the user device displays a payment interface in replacement of the conversation interface or overlaid on or within the conversation interface.

In some embodiments, the user can select or set up a payment scheme through the payment request interface. The payment scheme includes information related with the total payment amount, the payment amount/percentage for each paying member of the group, payment platform, and/or the criteria of who make the payments, and so on. In some embodiments, the user selects a scheme template and input detailed information into the scheme template.

In some embodiments, the user device is configured to receive a choice of payment platform from the user. In some embodiments, the payment request interface shows the only payment platform that is available. In some embodiments, the payment request interface provides a variety of payment platform that a starting user can choose from.

In accordance with some embodiments, in step 704, the user device determines one or more individual payers for the group payment request in accordance with a predetermined payment scheme associated with pre-established conversation group.

In some embodiments, the user device sends the group payment request to a server of the group chat session, wherein the group payment request including a group identifier for the pre-established conversation group, and wherein the server of the group chat session determines individual recipients of the group payment request based on the group identifier.

In some embodiments, when the user selects a payment scheme that includes all members of the group as payers, the server automatically selects every individual member as recipient of the payment request automatically. Therefore, the starting user does not have to choose individual group member as a payer one by one.

In some embodiments, the predetermined payment scheme specifies a respective payment proportion for each member of the pre-established conversation group. In some embodiments, the respective individual payment request requests an amount of payment from each member of the pre-established conversation group in accordance with the respective payment proportion specified for said member. For example, the payment scheme may determine that a payment is equally shared by the conversation group. For another example, the payment scheme assigns a payment proportion for each member. The user may choose 40% for user A, 30% for user B, 20% for user C and 10% for user D, for a total amount of $100. As a result, user A receives a payment request for $40, user B for $30, user C for $20 and user C for $10.

In accordance with some embodiments, the predetermined payment scheme specifies one or more criteria for dynamically selecting a subset of users from the pre-established conversation group as the individual payers for the group payment request.

In some embodiments, the one or more criteria for dynamically selecting a subset of users from the pre-established conversation group as the individual payers for the group payment request further comprises a payer selection priority based on how fast a member of the pre-established conversation group has accepted the group payment request. In some embodiments, the starting user selects a few users and only these users can receive or accept the payment request.

In some embodiments, only the first one or more users who respond can accept the payment request. For example, a payment scheme may specify that the first responding user paying $20, the second paying $10, the third paying $5 and only the first three responding users can pay. For another example, a payment scheme specifies that the first responding user pays the whole bill.

In some embodiments, the one or more criteria for dynamically selecting a subset of users from the pre-established conversation group as individual payers for the group payment request further comprises a payer selection priority based on how slowly a member of the pre-established conversation group has rejected the group payment request. For example, a payment scheme specifies that the last two users who reject the payment request share the bill or that the last user who rejects pays the whole bill.

It should be noted that, in some embodiments, a server also determines one or more individual payers. As a result, the process of a user device determining one or more individual payers for the group payment request includes mostly the user device receives individual payer information that is determined by the server.

In some embodiments, the user device sends a respective individual payment request to each of the determined individual payers.

In accordance with some embodiments, in step 705, the user device posts a group payment request as a chat message to the group chat session (involving users A, B, C, and D) in response to detecting the input from the user. FIG. 8A illustrates a conversation interface 800*a* of a group chat session shown in the user device of user A, who invokes the control to start a payment request process. As shown in FIG. 8A, the payment request is shown as a chat message 802*a* from user A in the conversation interface 800*a* displayed on user A's device, and the acceptance of the payment request by user B is shown as a chat message 804*a* from user B in the conversation interface 800*a* displayed on user A's device. Furthermore, the rejections of the payment request by users C and D are also shown as chat messages 806*a* and 808*a* from users C and D, respectively, in the conversation interface 800*a* displayed on user A's device. FIG. 8B illustrates a conversation interface 800*b* shown in the user device of user B. The conversation interface 800*b* shows the same group chat session as that shown on conversation interface 800*a*. As shown in FIG. 8B, the payment request is shown as a chat message 802*b* from user A in the conversation interface 800*b* displayed on user B's device, and the acceptance of the payment request by user B is shown as a chat message 804*b* from user B in the conversation interface 800*b* displayed on user B's device. Furthermore, the rejections of the payment request by users C and D are also shown as chat messages 806*b* and 808*b* from users C and D, respectively, in the conversation interface 800*b* displayed on user B's device.

In some embodiments, the group payment request is displayed in a way that shows an amount of payment. In some embodiments, the group payment request shows the amount of total payment, amount of each payment, and/or the payment scheme, and so on.

In some embodiments, when the user device posts a group payment request as a chat message, the chat message can only be seen or opened by the designated payers. Therefore, other group members who are not designated as payers by the payment scheme cannot see or open the group payment request.

In some embodiments, a payment request is configured to be displayed in a conversation interface of a mobile device of each of the designated payers separately as a private message or notification.

In some embodiments, in response to posting a group payment request as a chat message to the group chat session, the user device receives a plurality of payment responses from the plurality of other users participating in the pre-established conversation group. For example, a user can accept, reject, or accept with an amount to a payment request.

In some embodiments, the user device dynamically selects the subset of users from the pre-established conversation group as the individual payers for the group payment request in accordance with the one or more criteria and respective characteristics of the received plurality of payment responses.

For example, the starting user does not know how many users accept the payment request, but instead, sets up a payment scheme that equally share the total amount to all the accepting users. For a more specific example, when 4 out of 10 users accept a payment request of totally $100, each of the four users automatically pays $25.

In some embodiments, the payment request is configured to receive predetermined authorization operations from the respective conversation partner. In some embodiments, a designated payer of a payment request can choose to accept, reject or ignore the payment request.

In accordance with some embodiments, when a designated payer accepts a payment request, certain payment scheme permits or requires the designated payer to enter detail information, e.g., an amount, a proportion of a total amount, and so on.

In some embodiments, after the designated payer performs certain operation authorize payment acceptance, the user device of the designated payer sends a payment authorization to a payment platform and/or to the user device of the starting user.

In some embodiments, after receiving the respective payment acceptance from at least one of the plurality of conversation partners, the user device sends a confirmation to the respective payment platform based on the received payment acceptance. In some embodiments, the payment authorization includes an amount of payment that is authorized.

In some embodiments, the payment request can be accepted more than once by an individual member of the chat group. For example, a payment request includes an amount of $5. A member of the chat group receiving the payment request can accept it four times and as a result pays $20 in total.

In some embodiments, in step 706, the user device receives payment confirmation after the server of the communication platform has processed the payment transaction. In some embodiments, the payment confirmation is posted as a group message. In some embodiments, the starting user and the payer receive the payment confirmations separately as their private messages or private notifications. In some embodiments, the payment confirmation is sent from the server of the communication platform directly to the user advices of the starting users and the payers.

Figure 9:
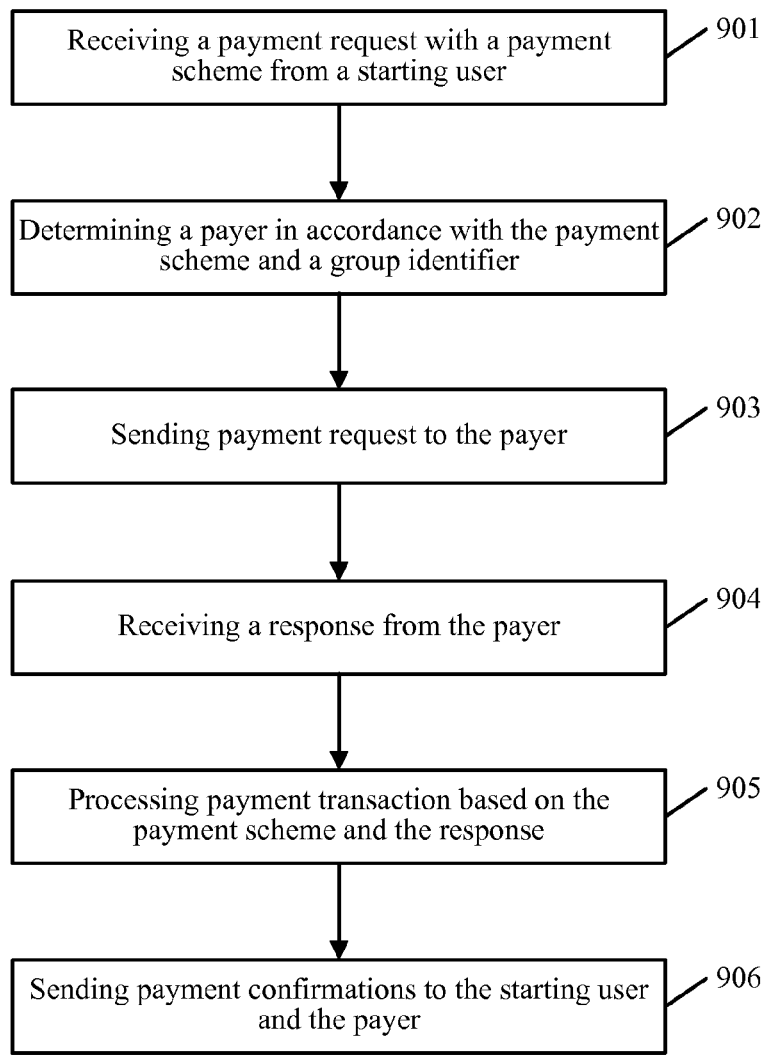
FIG. 9 is a flow chart of requesting and providing payment through a conversation group in accordance with some embodiments.

FIG. 9 is a flowchart of a method of requesting and providing payment based on a conversation group in accordance with some embodiments. The method is performed at a server having one or more processors and memory storing instructions for execution by the one or more processors. Many of the details are the same with those described with FIGS. 1-8, and are not repeated.

In some embodiments, in step 901, the server receives a payment request with a payment scheme from a user device of a starting user.

In some embodiments, step 901 follows step 703 or step 704 of FIG. 7.

In some embodiments, in step 902, the server determines individual payers in accordance with the payment scheme and a group identifier. In some embodiments, the payment scheme and group identifier information is pre-stored in the server.

In some embodiments, the user device has determined individual payers and includes payer information in the payment request.

In some embodiments, the payment request is configured to be sent to every member of a conversation group and the server determines payers according to their group identifiers.

The server can adopt payment schemes described in various embodiments in this application and determine one or more payers in accordance with these payment schemes.

In some embodiments, in step 903, the server sends payment request to one or more group members (who are designated payers).

In some embodiments, the payment request is posted as a group message in the chat message to the group chat session. This chat message is sent to the user device of every individual payer and shown in their conversation interface.

In some embodiments, in addition to or instead of the group message, each individual member receives an individual payment request. In some embodiments, the individual payment requests received by individual members are different from each others.

In some embodiments, in step 904, the server receives a response from an individual payer. In some embodiments, the response can be acceptation, rejection, acceptation with an amount. In some embodiments, a response includes a time of sending the response. In some embodiments, the server records the time of receiving a response.

In some embodiments, in step 905, the server processes payment transaction based on the payment scheme and the response. In some embodiments, processing the payment transaction includes sending payment information to the payment platform included in the payment scheme.

In some embodiments, in step 906, the server receives a transaction completion confirmation from the server of the communication platform and sends payment confirmation to the payer and the payee.

In some embodiments, the server of the communication platform directly sends payment confirmation to payers and payees.

Figure 10:
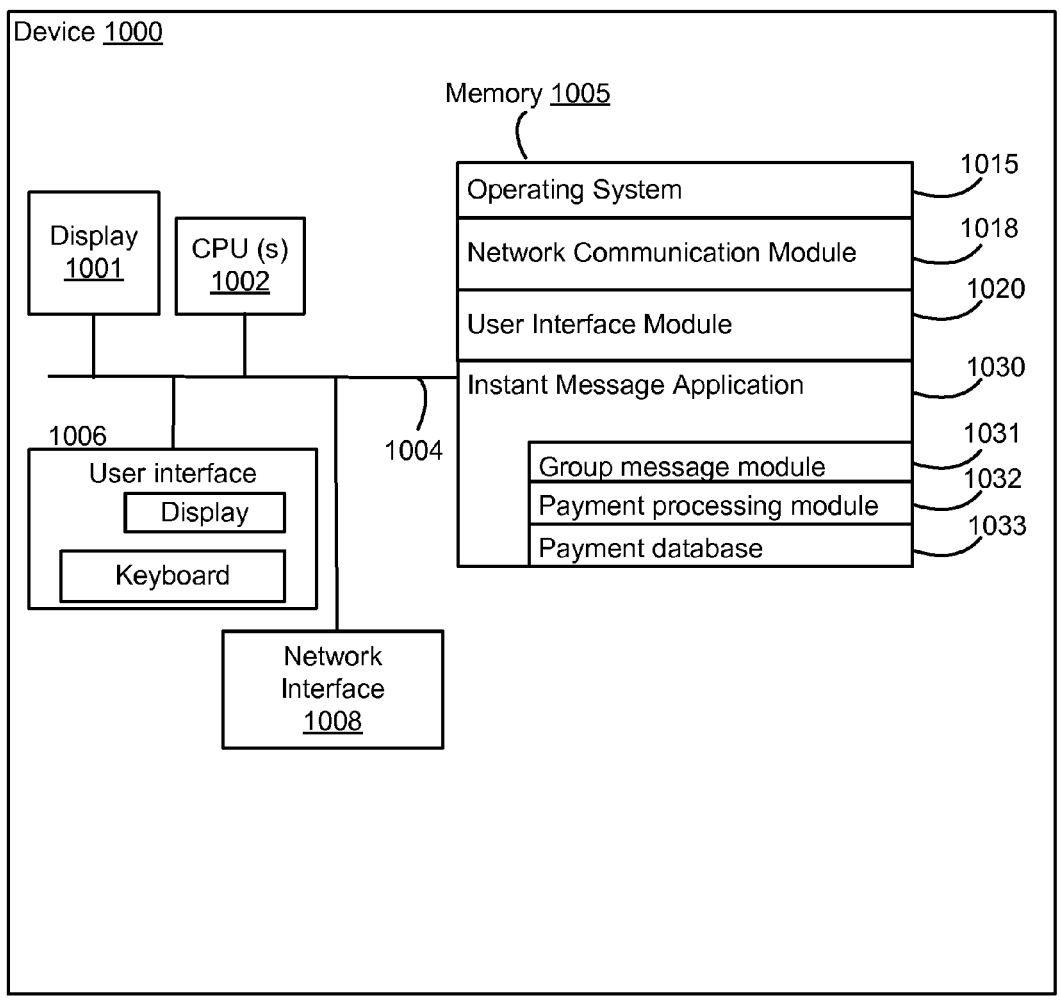
FIG. 10 is a structural diagram of a user device for requesting and providing payment based on a conversation group in accordance with some embodiments.

FIG. 10 is a diagram of an example implementation of a user device 1000 in accordance with some embodiments. The user device 1000 can serve as the terminal devices described above with respect to FIGS. 1-9. In some embodiments, the device 1000 includes one or more processing units (CPU's) 1002, one or more network or other communications interfaces 1008, a display 1001 and memory 1005. The communication buses may include circuitry (sometimes called a chipset) that interconnects and controls communications between system components. The memory 1005 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1005 may optionally include one or more storage devices remotely located from the CPU(s) 1002. The memory 1005, including the non-volatile and volatile memory device(s) within the memory 1005, comprises a non-transitory computer readable storage medium.

In some implementations, the memory 1005 or the non-transitory computer readable storage medium of the memory 1005 stores the following programs, modules and data structures, or a subset thereof including an operating system 1015, a network communication module 1018, a user interface module 1020, and an instant message application 1030.

The operating system 1015 includes procedures for handling various basic system services and for performing hardware dependent tasks.

The network communication module 1018 facilitates communication with other devices via the one or more communication network interfaces 1008 (wired or wireless) and one or more communication networks, such as the Internet, other wide area networks, local area networks, metropolitan area networks, and so on.

The user interface module 1020 is configured to receive user inputs through the user interface 1006.

The instant message application 1030 is configured to provide instant message communication to the user of device 1000. Instant message communication includes sending and receiving, text, image, audio and video messages among users of an instant message application. Besides other modules, the instant message application 1030 comprises a group message module 1031, a payment processing module 1032 and a payment database 1033.

The group message module 1031 is configured to send, receive and display group messages. The group message module 1031 is further configured to manage conversation group for a user and acquire group information, e.g., a group identifier.

The payment processing module 1032 is configured to provide a control for requesting payment, display a payment interface, receive input of a payment request, and send and receive a payment request.

The payment database 1033 is configured to store payment related information, including payment account information of the user, payment scheme options of a user and of a conversation group, and so on.

Figure 11:
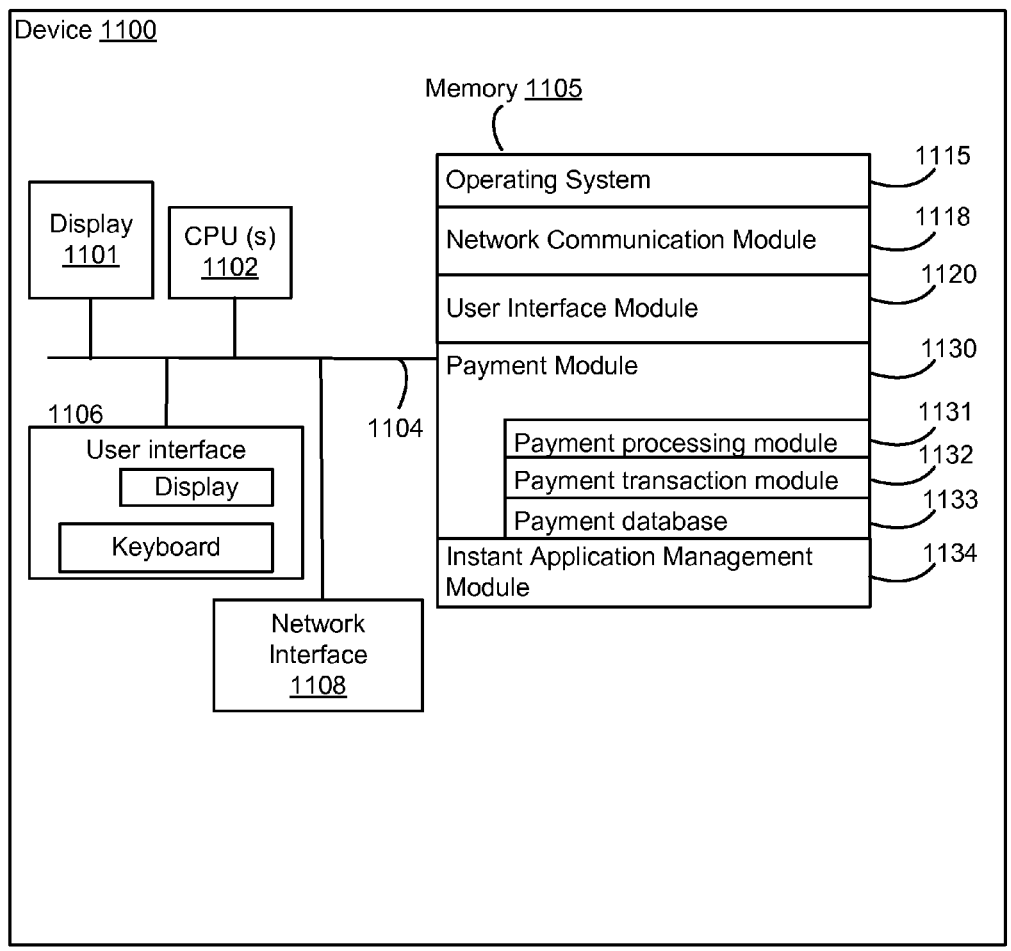
FIG. 11 is a structural diagram of a server for requesting and providing payment based on a conversation group in accordance with some embodiments.

FIG. 11 is a diagram of an example implementation of a server 1100 in accordance with some embodiments. The server 1100 can serve as the server of the communication platform as described above with respect to FIGS. 1-9. In some embodiments, the server 1100 includes one or more processing units (CPU's) 1102, one or more network or other communications interfaces 1108, a display 1101 and memory 1105. The communication buses may include circuitry (sometimes called a chipset) that interconnects and controls communications between system components. The memory 1105 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1105 may optionally include one or more storage devices remotely located from the CPU(s) 1102. The memory 1105, including the non-volatile and volatile memory device(s) within the memory 1105, comprises a non-transitory computer readable storage medium.

In some implementations, the memory 1105 or the non-transitory computer readable storage medium of the memory 1105 stores the following programs, modules and data structures, or a subset thereof including an operating system 1115, a network communication module 1118, a user interface module 1120, a payment module 1130 and an instant application management module 1135.

The operating system 1115 includes procedures for handling various basic system services and for performing hardware dependent tasks.

The network communication module 1118 facilitates communication with other devices via the one or more communication network interfaces 1108 (wired or wireless) and one or more communication networks, such as the Internet, other wide area networks, local area networks, metropolitan area networks, and so on.

The user interface module 1120 is configured to receive user inputs through the user interface 1106.

The payment module 1130 is configured to provide instant messaging communication to the user of device 1100. Besides other modules, the payment module application 1130 comprises a payment processing module 1131, a payment transaction module 1132 and a payment database 1133.

The payment processing module 1131 is configured to receive payment request from a user device and sends it to other user devices. The payment processing module 1131 is further configured to determine payers and payees in accordance with a payment scheme and other information.

The payment transaction module 1132 is configured to receive payment acceptance from a payer and instruct a payment platform to process the payment transaction. The payment transaction module 1132 is further configured to receive payment confirmation from a payment platform and send payment confirmations to payers and payees.

The payment database 1133 is configured to store payment related information, including payment account information of the user, payment scheme options of a user and of a conversation group, payment platform information, etc.

The instant application management module 1134 is configured to support the instant application communication among user devices, including supporting group chats.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of requesting and receiving payment in a group chat environment, comprising:
at a user device having one or more processors and memory for storing one or more programs to be executed by the one or more processors:

displaying a conversation interface of a group chat session for a pre-established conversation group, the pre-established conversation group including a user of the user device and a plurality of other users participating in the pre-established conversation group;

providing, in the conversation interface of the group chat session, a control for requesting payment from the pre-established conversation group;

detecting an input from the user invoking the control for requesting payment of a total amount from the pre-established conversation group;

in response to detecting the input from the user, posting a group payment request as a first chat message to the group chat session, wherein the first chat message is sent to the plurality of other users participating in the pre-established conversation group, and payment responses accepting or rejecting the group payment request are received from one or more of users of the pre-established conversation group; and after the group payment request is posted to the pre-established conversation group and the payment responses are received from the one or more users of the pre-established conversation group, receiving a payment confirmation for a predetermined payment scheme that divides the total amount among one or more selected users, wherein:

in accordance with a determination that a first number of users have accepted the payment request, the total amount is divided among the first number of users to obtain a first distribution of payments according to the predetermined payment scheme, and an aggregated payment of the total amount specified in the group payment request is transferred from the first number of users to the user of the user device;

in accordance with a determination that a second number of users have accepted the payment request, the total amount is divided among the second number of users to obtain a second distribution of payments according to the predetermined payment scheme, and the aggregated payment of the total amount specified in the group payment request is transferred from the second number of users to the user of the user device, wherein the second distribution of payments is different from the first distribution of payments; and in accordance with a determination that at least one user has rejected the payment request, determining an order by which a third number of users have failed to reject the payment request, including at least one user that has ignored the payment request, wherein the total amount is divided among the third number of users that have failed to reject the payment request to obtain a third distribution of payments according to the predetermined payment scheme.

2. The method of claim 1, wherein posting the group payment request as the first chat message to the group chat session comprises:

sending the group payment request to a server of the group chat session, wherein the group payment request including a group identifier for the pre-established conversation group, and wherein the server of the group chat session determines individual recipients of the group payment request based on the group identifier.

3. The method of claim 1, further comprising:

determining one or more individual payers for the group payment request in accordance with a predetermined payment scheme associated with the pre-established conversation group; and sending a respective individual payment request to each of the determined individual payers.

4. The method of claim 3, wherein the predetermined payment scheme specifies a respective payment proportion for each member of the pre-established conversation group.

5. The method of claim 4, wherein the respective individual payment request requests an amount of payment from each member of the pre-established conversation group in accordance with the respective payment proportion specified for said member.

6. The method of claim 3, wherein the predetermined payment scheme specifies one or more criteria for dynamically selecting a subset of users from the pre-established conversation group as the individual payers for the group payment request.

7. The method of claim 6, wherein the one or more criteria for dynamically selecting a subset of users from the pre-established conversation group as the individual payers for the group payment request further comprises a payer selection priority based on how fast a member of the pre-established conversation group has accepted the group payment request.

8. The method of claim 6, wherein the one or more criteria for dynamically selecting a subset of users from the pre-established conversation group as individual payers for the group payment request further comprises a payer selection priority based on how slowly a member of the pre-established conversation group has rejected the group payment request.

9. The method of claim 6, further comprising:

in response to posting the group payment request as the first chat message to the group chat session, receiving a plurality of payment responses as respective chat messages from the plurality of other users participating in the pre-established conversation group; and dynamically selecting the subset of users from the pre-established conversation group as the individual payers for the group payment request in accordance with the one or more criteria and respective characteristics of the received plurality of payment responses.

10. The method of claim 3, further comprising:

in response to detecting the input from the user, displaying a payment request interface that is configured to receive an input of payment requirement information from the user.

11. A device of request and receiving payment in a group chat environment, comprising:

one or more processors;

memory storing one or more program modules configured for execution by the one or more processors, the one or more program modules including instructions for:

displaying a conversation interface of a group chat session for a pre-established conversation group, the pre-established conversation group including a user of the user device and a plurality of other users participating in the pre-established conversation group;

providing, in the conversation interface of the group chat session, a control for requesting payment from the pre-established conversation group;

detecting an input from the user invoking the control for requesting payment of a total amount from the pre-established conversation group;

in response to detecting the input from the user, posting a group payment request as a first chat message to the group chat session, wherein the first chat message is sent to the plurality of other users participating in the pre-established conversation group, and payment responses accepting or rejecting the group payment request are received from one or more of users of the pre-established conversation group; and after the group payment request is posted to the pre-established conversation group and the payment responses are received from the one or more users of the pre-established conversation group, receiving a payment confirmation for a predetermined payment scheme that divides the total amount among one or more selected users, wherein:

in accordance with a determination that a first number of users have accepted the payment request, the total amount is divided among the first number of users to obtain a first distribution of payments according to the predetermined payment scheme, and an aggregated payment of the total amount specified in the group payment request is transferred from the first number of users to the user of the user device;

in accordance with a determination that a second number of users have accepted the payment request, the total amount is divided among the second number of users to obtain a second distribution of payments according to the predetermined payment scheme, and the aggregated payment of the total amount specified in the group payment request is transferred from the second number of users to the user of the user device, wherein the second distribution of payments is different from the first distribution of payments; and in accordance with a determination that at least one user has rejected the payment request, determining an order by which a third number of users have failed to reject the payment request, including at least one user that has ignored the payment request, wherein the total amount is divided among the third number of users that have failed to reject the payment request to obtain a third distribution of payments according to the predetermined payment scheme.

12. The device of claim 11, wherein posting the group payment request as the first chat message to the group chat session comprises:

sending the group payment request to a server of the group chat session, wherein the group payment request including a group identifier for the pre-established conversation group, and wherein the server of the group chat session determines individual recipients of the group payment request based on the group identifier.

13. The device of claim 11, wherein the one or more program modules further comprise instructions for:

determining one or more individual payers for the group payment request in accordance with a predetermined payment scheme associated with pre-established conversation group; and sending a respective individual payment request to each of the determined individual payers.

14. The device of claim 13, wherein the predetermined payment scheme specifies a respective payment proportion for each member of the pre-established conversation group.

15. The device of claim 14, wherein the respective individual payment request requests an amount of payment from each member of the pre-established conversation group in accordance with the respective payment proportion specified for said member.

16. The device of claim 13, wherein the predetermined payment scheme specifies one or more criteria for dynamically selecting a subset of users from the pre-established conversation group as the individual payers for the group payment request.

17. The device of claim 16, wherein the one or more criteria for dynamically selecting a subset of users from the pre-established conversation group as the individual payers for the group payment request further comprises a payer selection priority based on how fast a member of the pre-established conversation group has accepted the group payment request.

18. The device of claim 16, wherein the one or more criteria for dynamically selecting a subset of users from the pre-established conversation group as individual payers for the group payment request further comprises a payer selection priority based on how slowly a member of the pre-established conversation group has rejected the group payment request.

19. The device of claim 16, wherein the one or more program modules further comprise instructions for:

in response to posting the group payment request as the first chat message to the group chat session, receiving a plurality of payment responses as respective chat messages from the plurality of other users participating in the pre-established conversation group; and dynamically selecting the subset of users from the pre-established conversation group as the individual payers for the group payment request in accordance with the one or more criteria and respective characteristics of the received plurality of payment responses.

20. A non-transitory computer readable storage medium, storing one or more programs for execution by one or more processors, the one or more programs comprising instructions for:

displaying a conversation interface of a group chat session for a pre-established conversation group, the pre-established conversation group including a user of the user device and a plurality of other users participating in the pre-established conversation group;

providing, in the conversation interface of the group chat session, a control for requesting payment from the pre-established conversation group;

detecting an input from the user invoking the control for requesting payment of a total amount from the pre-established conversation group; and in response to detecting the input from the user, posting a group payment request as a first chat message to the group chat session, wherein the first chat message is sent to the plurality of other users participating in the pre-established conversation group, and payment responses accepting or rejecting the group payment request are received from one or more of users of the pre-established conversation group; and after the group payment request is posted to the pre-established conversation group and the payment responses are received from the one or more users of the pre-established conversation group, receiving a payment confirmation for a predetermined payment scheme that divides the total amount among one or more selected users, wherein:

in accordance with a determination that a first number of users have accepted the payment request, the total amount is divided among the first number of users to obtain a first distribution of payments according to the predetermined payment scheme, and an aggregated payment of the total amount specified in the group payment request is transferred from the first number of users to the user of the user device;

in accordance with a determination that a second number of users have accepted the payment request, the total amount is divided among the second number of users to obtain a second distribution of payments according to the predetermined payment scheme, and the aggregated payment of the total amount specified in the group payment request is transferred from the second number of users to the user of the user device, wherein the second distribution of payments is different from the first distribution of payments; and in accordance with a determination that at least one user has rejected the payment request, determining an order by which a third number of users have failed to reject the payment request, including at least one user that has ignored the payment request, wherein the total amount is divided among the third number of users that have failed to reject the payment request to obtain a third distribution of payments according to the predetermined payment scheme.

\* \* \* \* \*